United States Patent [19]

Klusmire

[11] Patent Number: 4,932,103
[45] Date of Patent: Jun. 12, 1990

[54] BRAKE-SIZING DEVICES FOR FOOD STUFFING APPARATUS AND METHODS OF USE

[75] Inventor: Galen J. Klusmire, Carmel, Calif.
[73] Assignee: Teepak, Inc., Westchester, Ill.
[21] Appl. No.: 312,991
[22] Filed: Feb. 17, 1989
[51] Int. Cl.$^5$ .............................................. A22C 21/00
[52] U.S. Cl. .......................................... 17/49; 17/35; 17/41
[58] Field of Search ................................ 17/49, 33–35, 17/1 F, 38, 41

[56] References Cited

U.S. PATENT DOCUMENTS

| | | | |
|---|---|---|---|
| 3,317,950 | 5/1967 | Ziolko | 17/41 |
| 4,467,499 | 8/1984 | Beckman et al. | 17/49 |
| 4,744,129 | 5/1988 | Weerth | 17/33 |
| 4,773,128 | 9/1968 | Stanley et al. | 17/33 |

Primary Examiner—Willis Little
Attorney, Agent, or Firm—Howard M. Ellis; Michael L. Dunn

[57] ABSTRACT

A highly versatile, resilient and durable food casing sizing device for regulating the release of unfilled casing from a stuffing horn is specially useful in filling casings having string tied end-closures. The sizing ring releases looped strings and other suspending means which may become compressed against the exterior wall of the casing and filling horn without rupturing the casing when filling is initiated while also providing a high degree of product dimensional uniformity. Differential compression of the sizing device also permits stuffing curved "old world" style sausage products. The sizing device which is flexible can also be used for stuffing delicate thin walled casings, such as unreinforced thermoplastic types and collagen casings without damage.

21 Claims, 4 Drawing Sheets

BRAKE-SIZING DEVICES FOR FOOD STUFFING APPARATUS AND METHODS OF USE

BACKGROUND OF THE INVENTION

The present invention relates generally to new and useful devices and methods of packaging food products, and more specifically, to improved tubular casing brake or sizing devices for food stuffing apparatus.

In the manufacture of sausage products, a tubular food casing, such as cellulose is loaded onto the stuffing horn of a filling machine and stuffed with an emulsion, usually comprised of comminuted meat together with fillers, seasonings, spices, etc. In the case of small sausage products, like frankfurters, the filled casings are twisted, tied, or clipped into suitable links at predetermined intervals and further processed.

For larger diameter sausage products, like bolognas, salamis, and the like, the meat emulsion is introduced into larger, heavier walled fibrous type casings or casings formed from thermoplastic films and formed into chubs or lengthy individual sticks. Like the smaller products, these large diameter sausage products are filled on stuffing machines comprising a meat pump and a delivery attachment in the form of a stuffing horn. However, unlike small diameter products, larger type sausage products, such as bologna, packaged in large code casings rely on heavy duty end-closures in the form of metal clips or caps and frequently tied with a looped string, twine or other equivalent means attached, all for securely containing the meat emulsion during the stuffing process and for suspending the product during further processing, e.g., cooking and smoking, storage and display. U.S. Pat. No. 4,165,593 is one example of cut lengths of casing closed at one end with a clip for securing a loop for suspending the sausage product. The casing, end-closure clip and loop are manufactured in a first operation and later fitted onto the horn of a filling machine by meat processors in an independent operation where it is filled and closed at the second end.

In stuffing large diameter casings a sizing or braking system can be employed for controlling casing expansion to avoid exceeding casing manufacturers recommended stuffing diameters while also preventing back "purge" of meat emulsion. This is achieved with a brake device which applies uniform pressure to the exterior wall of unfilled casing on a stuffing horn as emulsion fills the casing interior. The braking device, which may comprise a ring assembly engages the casing restricting its rate of withdrawal from the horn by regulating drag generated by friction. Representative brake systems are disclosed by U.S. Pat. Nos. 3,748,690 (Niedecker); 3,621,513 (Kupcikevicius); 3,457,588 (Myles et al); 4,438,545 (Kupcikevicius et al) and 4,558,488 (Martinek), to name but a few.

In most brake/sizing systems force is applied uniformly and circumferentially (360°) to the outer casing wall by compression against the stuffing horn, etc. The stuffing cycle typically begins with the operator loading a precut length of casing onto the stuffing horn with the first end of the casing having a tied or clipped end-closure and a looped string attached thereto. The closed, first end of the casing is flush with the outlet end of the horn which horn is then indexed and aligned with the brake ring opening. The brake ring assembly is advanced so the loaded horn is coaxial with the brake ring engaging the casing against the horn closest to the outlet end. Frequently, however, in the process the looped string hanging from the clipped or capped end-closure or string tied casings become "locked" between the brake ring and casing side wall. Consequently, unless the string is released before stuffing is initiated casing is unable to peel off the horn, pressure builds up quickly at the outlet end of the horn causing the casing to rupture. This means costly down time for cleanup, lost meat emulsion in the work area, lost production and wasted casings.

Accordingly, the present invention contemplates improved sizing/braking devices for food stuffing apparatus for filling string tied/looped casing while significantly reducing snagging and consequent casing rupture. This translates into important economic advantages through higher production efficiencies with less down time.

A further important consideration in preparation of large diameter sausage products is the maintenance of accurate size control over the entire length of the sausage stick. It is particularly important that the diameter of the large sausage products be carefully controlled so that meat packers are able to cut the sausage into slices of predetermined thickness and diameter for prepackaging. The objective is to have a given number of slices weigh precisely a predetermined amount for each package. As a result, meat processors are constantly striving to improve operations that affect finished package yields. Constant sizing control during stuffing of green stick diameter assures more uniform slice weight and minimizes package over and under weight variations.

U.S. Pat. Nos. 3,748,690 and 3,872,543 to Niedecker disclose popular style sizing devices for controlling product diameter. During filling, controlled release of casing is achieved by a snubbing element bearing against the outlet end of the stuffing horn with the casing therebetween. It has been found, however, that the outlet end of stuffing horns can be fragile and subject to bending and loss of cylindrical shape unless specially reinforced. Because of distortion in roundness of horn outlets snubbing rings, particularly those which operate by engaging the edge of stuffing horns, such as disclosed by the Niedecker patents can fail to provide accurate product diameter control during filling operations.

Although snubbing lips of devices like those of Niedecker are fabricated from essentially resilient materials they are nevertheless made relatively rigid and nonflexible due to steel backing members exerting pressure thereon. Consequently, desired flexibility and resiliency of such devices ar lost at the point of constriction of casing against the filling horn making it difficult for irregular shaped folds in casing to smoothly negotiate constriction points without producing deviations in constant pressures and ultimately variations in product diameter. Rigid steel holders for such devices also shorten the useful life expectancy of these sizing rings due to excess wear.

Accordingly, the present invention also contemplates improved flexibility and longer wearing sizing devices which offer a high degree of dimensional uniformity and caliber control without dependence on horn roundness and cylindrical shape for optimum size control during stuffing, and without casing wall thickness interfering with sizing ring performance.

SUMMARY OF THE INVENTION

It is a principal object of the present invention to provide for a novel food casing braking or sizing device which comprises a rounded body with an outer grooved rim, generally resembling in appearance a sheave-like body or wheel associated with a pulley block for guiding a rope or cable. The improved sizing ring comprises a resilient, sheave-like body with a central axis adapted to receive a filling horn of a stuffing apparatus having casing mounted thereon. The device frictionally engages the casing against the filling horn when axially compressed causing an inward expansion transverse to the central axis and restriction on the casing and rate of release from the horn during the filling cycle. The device provides filled sausage products of high dimensional uniformity for higher product yield for presliced packaging, notwithstanding distortion or lack of true roundness at the horn outlet. Because of the flexibility and resiliency of the sizing ring even at the point of contact with the casing, even with irregular or heavy folds the casing is able to negotiate past the point of compression of the device against the horn with relatively constant pressure. This translates into consistent caliber control for the entire length of the stick.

It is a further principal object of the present invention to provide an improved food casing braking device comprising the resilient, generally sheave-like sizing ring with a grooved outer rim and an inner rim defining an axial bore for receiving a filling horn in combination with housing means as a first pressure member for the sizing ring and a pressure plate as the second pressure member for axially compressing the sizing ring in the housing means.

It is yet a further object of the invention to provide means for holding the pressure members of the sizing ring assembly towards one another to compress segment(s) of the ring for imparting various configurations to the sizing ring bore. By axially compressing segments of the sizing ring, for example, an elliptical configuration can be imparted to the sizing ring bore forming at least one gap between the sizing ring inner rim and the filling horn. The gap permits a looped string or other suspending means affixed to one end of a casing from being locked between the inner rim of the casing brake and outside wall of the casing and stuffing horn while also restricting release of casing at the other points along the inner rim for continuous and accurate size control. This significantly reduces the occurrence of casing rupture, down time and lost production resulting in an important economic advantage over previous efforts in this field.

A still further object of the invention is to provide a sizing device for axial compression of opposing segments of the sizing ring for inward expansion of the inner rim of the sizing ring for forming a curved sausage product.

It is also an object of the invention to provide for an improved method for filling tubular food casing by the step which comprise:

(a) loading a precut food casing onto a stuffing horn, wherein the casing has first and second ends, interior and exterior walls and an end-closure at the first end with means for suspending the casing when filled, affixed to the first end;

(b) applying a casing brake to the casing loaded on the stuffing horn, the brake comprising a resilient, generally sheave-like sizing ring having a grooved outer rim and an inner rim defining an axial bore for receiving the stuffing horn, the ring being axially compressed to impart an elliptical configuration to the bore, the ring encircling the exterior wall of the casing while the means for suspending the filled casing lies between the exterior wall of the casing and inner rim of the sizing ring;

(c) filling the casing with a foodstuff while simultaneously controlling the rate of release of casing from the stuffing horn and releasing the means for suspending the filled casing without rupturing the casing, and (d) closing the second end of the filled casing.

It is still a further object of the present invention to provide a method for filling a tubular food casing which includes the steps of:

(a) loading a food casing on a stuffing horn at a filling station, the casing having interior and exterior walls;

(b) applying a casing brake to the loaded stuffing horn, the brake comprising a resilient, generally sheave-like sizing ring having a grooved outer rim and an inner rim defining an axial bore for receiving the loaded stuffing horn, the sizing ring being axially compressed to circumferentially expand the inner rim of the sizing ring to engage the exterior wall of the casing, and (c) filling the food casing while controlling the release of casing from the stuffing horn for dimensional uniformity.

DESCRIPTION OF THE DRAWINGS

For a further understanding of the invention as well as its characterizing features, reference should now be made to the following detailed description thereof taken in conjunction with the accompanying drawings wherein.

DETAILED DESCRIPTION OF THE INVENTION

Figure 1:
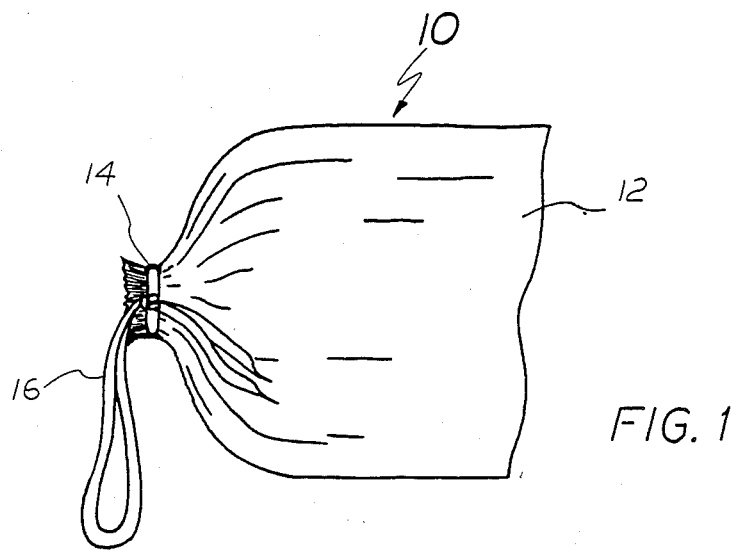
FIG. 1 is a partial view of a filled food casing with an end-closure and a looped string affixed to the end-closure.

Turning first to FIG. 1, there is shown a filled sausage product 10 having a heavy walled outer tubular casing 12 which may be a fibrous reinforced type. However, for smaller diameter products unreinforced nonfibrous type casings may suffice. Casings fabricated from collagen and thermoplastic materials, including other thin walled films are also useful in practicing methods of the present invention. Before shipping to food processors for filling, clip 14 applied as a closure member is affixed to one end of a precut length of casing, and a heavy-duty looped string or other equivalent hanger means attached thereto. Such precut casings having various means for vertically suspending a product after filling are widely known, and as such form no part of the invention. Although the filled casing of FIG. 1 is shown with a conventional clip 14 and a heavy looped string/twine 16, alternative end-closures are contemplated for use with the brake assemblies and methods described herein. One example would be a metal end-closure cap and a looped string. Methods contemplated herein also include cut lengths of casing without metal clips and caps where instead end-closures are formed and tied off with a looped string alone, i.e., string tied casing.

Figure 2:
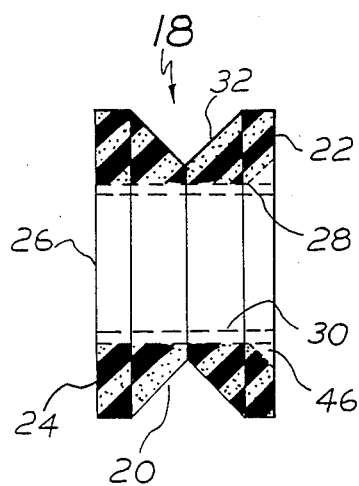
FIG. 2 is a side elevational view of the resilient sizing ring showing the grooved outer rim and internal bore configurations.
Figure 3:
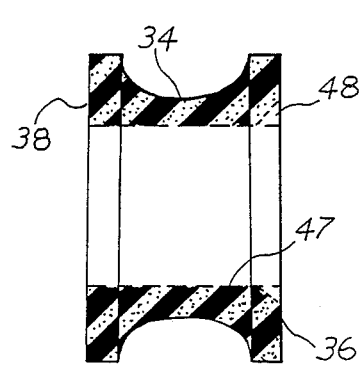
FIG. 3 is a side elevational view of an alternative embodiment of the resilient sizing ring.
Figure 4:
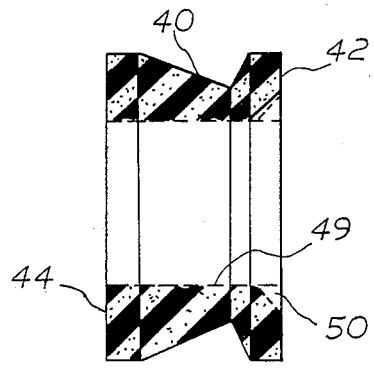
FIG. 4 is yet a further embodiment of the resilient sizing ring of the invention with an asymmetrically shaped outer groove.

Casing brake 18 (FIG. 2) is one embodiment readily adapted for controlling the release of casing from a stuffing horn of a filling apparatus. Brake 18 and alternative embodiments like those of FIGS. 3 and 4 provide exceptional caliber control and product uniformity for presliced packaging with, for instance, shirred fibrous casing. But, the brake/sizing ring assemblies are especially well suited for individual precut lengths of casing like those of FIG. 1 having looped strings 16, etc., as suspending means. Heretofore, there was a significantly high level of casing breakage during filling of string tied casings, etc., because devices used for sizing control circumferentially engaging the unfilled casing against the filling horn did not provide the clearance needed for releasing the string lodged alongside the horn upon actuation of the meat pump. Consequently, unfilled casing was unable to readily peel from the horn, pressure build up would occur rapidly at the horn outlet and rupture the casing. Hence, the sizing devices of the present invention not only provide exceptional caliber control for presliced products, but on a statistical basis significantly reduces the frequency of blow-outs associated with string tied casings, etc.

Figure 6:
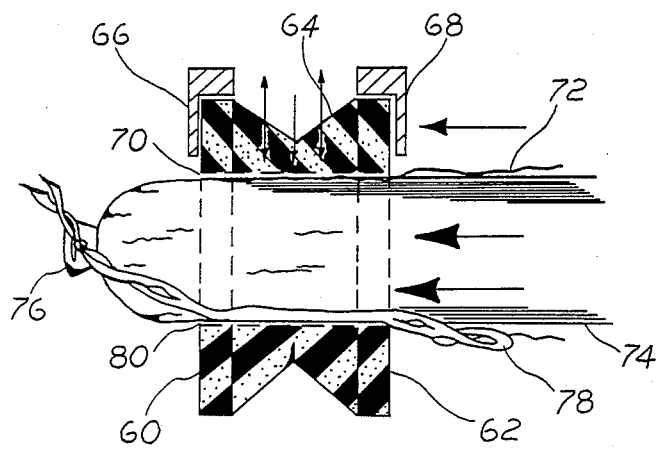
FIG. 6 is a partial side elevational view of the brake assembly over a stuffing horn in which the assembly is compressed during the filling cycle.
Figure 7:
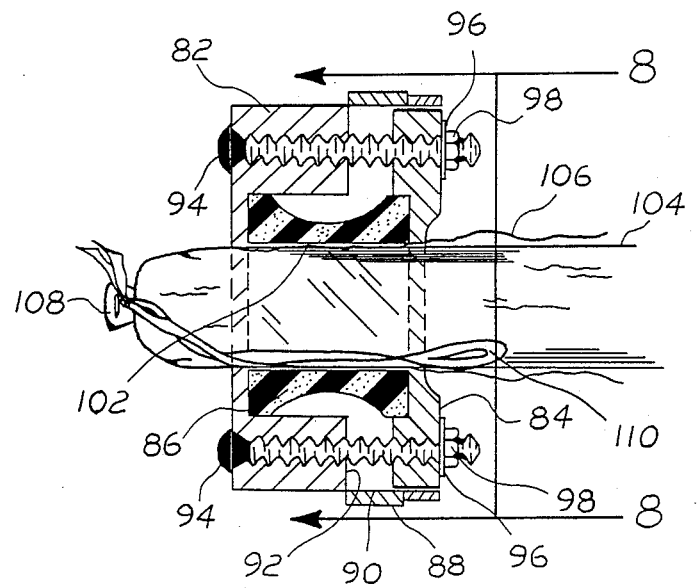
FIG. 7 is a top sectional view of the brake assembly including the sizing ring mounted in a housing.

The casing sizing/braking device comprises a unitized, preferably one-piece resilient, sheave-like body 18 with a grooved outer or peripheral rim 20 between first end plate 22 and second end plate 24. The brake includes a central opening or bore 26 defined by a cylindrically shaped inner rim 28 for receiving the outlet end of a filling horn shown by broken lines 30 with sufficient clearance to also accommodate a food casing (FIGS. 6 and 7). Grooved outer rim 20 may have virtually any inwardly indented sectional configuration, provided that upon axial compression end plates 22 and 24 produce an inwardly directed bias of cylindrically shaped inner rim 28 sufficient to compressively engage the unfilled casing against the stuffing horn at the time of filling. Accordingly, the peripheral outer groove 20 may be either symmetrical or asymmetrical. An example of a suitably grooved outer rim having a spaced symmetrical configuration is the generally V-shaped groove 32 (FIG. 2) centrally spaced between first and second end plates 22 and 24. A further representative example of a grooved outer rim is inwardly rounded or generally concave-shaped groove 34 (FIG. 3) evenly spaced between first and second end plates 36 and 38.

In those instances where the cylindrical shape of the outlet end of a filling horn is distorted, not completely round or off-center, asymmetrical wedge-shaped groove 40 (FIG. 4) has been found specially effective in maintaining a high level of dimensional uniformity of product produced. Groove 40 is positioned closer to first end plate 42 than second end plate 44. With axial compression of end plates 42 and 44 towards one another, casing is compressed against the stuffing horn upstream from the edge of the outlet end of the horn for more uniform controlled release of unfilled casing. Accordingly, the braking device provides the added benefit of enabling continued use of dented or damaged horns, or horns which through constant use and handling have lost their true cylindrical shape, especially at the outlet end, and as a result, accurate size control over the entire length of the sausage product would otherwise be lost.

Figure 5:
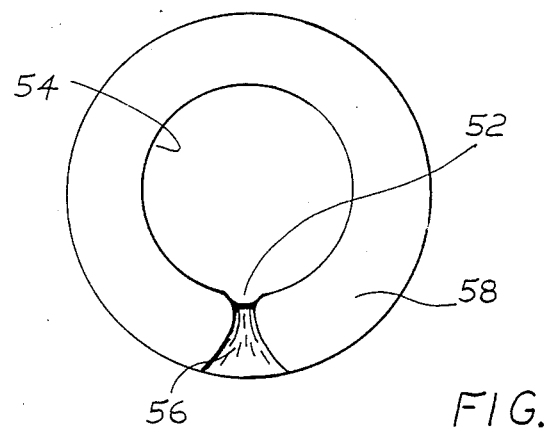
FIG. 5 is an axial end view of the sheave-like sizing ring with a funnel guide and groove in the inner rim for releasing the looped string which may be lodged between the rim and casing on the stuffing horn.

Optionally, but preferably, the sizing devices (FIGS. 2–4) include a beveled edge 46, 48, 50 at inner rim 28, 47, 49 and junction of first end plates 22, 36 and 42, respectively. A beveled edge is useful in facilitating insertion of the filling horn loaded with casing into the bore of the sizing ring. The sizing ring (FIG. 5) may also have a channel or groove 52 in inner rim 54 running parallel with the axis of the ring. Groove 52 is a useful guide or trough for a hanging looped string especially when a heavier gauge of twine must pass through the space between the inner rim of the sizing ring and the side wall of the casing. This readily assures passage of the looped hanger without rupture of the casing when filling is initiated. Groove 52 may also have a flared funnel or substantially V-shaped section 56 on the face of end plate 58. V-shaped section 56 is wider than groove 52 so it readily engages a hanging loop which is not fully aligned with groove 52. Hence, V-shaped section 56 is a useful threading means for releasing string tied casing.

The foregoing braking/sizing devices are resilient, and may be fabricated from suitable elastomeric materials, including natural and synthetic rubbers, SBR, ABR, NBR, polyester and especially polyurethane elastomers, and other food grade polymers. The braking ring can be sufficiently flexible and resilient for use even with more delicate thin walled, unreinforced casings having less mechanical strength, e.g., collagen, thermoplastic types, without damaging them during the filling process. This flexibility also provides greater resistance to wear for exceeding the useful life expectancy of conventional type sizing rings. In this regard, the sizing rings have an indentation hardness of about 75 to about 95 on the Shore A durometer, and more preferably, an indentation hardness from about 85 to 90. The flexible characteristics of the brake ring not only enables absorption (passage) of larger heavier casing folds during filling while maintaining constant pressure for a more uniform finished caliber, but their resilient properties lessen the rate of wear to the brake ring itself. With other braking devices, such as those disclosed by Niedecker, where the brake ring is backed with a rigid steel support compression of the snubbing lips against a horn outlet, especially one having irregularities in roundness, results in excessive wear to the snubbing lips and a shorten life span for the device.

With axial compression of end plates 60, 62 (FIG. 6) relative to one another, outer rim 64 aligned with adjacent compressing means 66, 68 is biased inwardly. The interior segment of rim 70 coinciding with the inwardly displaced portion of the braking device engages with unfilled casing 72 on filling horn 74 restricting the rate of removal of casing for controlling product diameter As will be discussed in greater detail below, some or all segments of the end plates of the device may be axially compressed for uniform application of circumferential pressure by inner rim 70 against the outer side wall of casing 72. However, as illustrated by FIG. 6, one or more segments of the brake ring need only be compressed for achieving the objectives of this invention. Casing 72 includes a metal end cap closure 76 and looped string 78 attached thereto. When only a portion of inner rim 70 is forced inwardly the circular configuration of the inner rim becomes distorted sufficiently to open a slot 80 for passage of looped string 78 past the sizing device unencumbered so rupture of the casing is avoided during the filling process.

Figure 8:
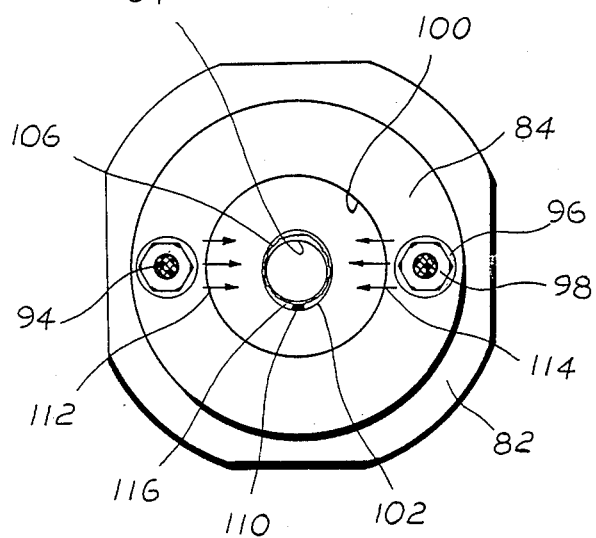
FIG. 8 is a full end view of the sizing ring in the housing taken along line 8—8 of FIG. 7.

For regulating product diameter, shape and release of string or other suspending means affixed to the end of a food casing during filling, the brake assembly comprises first and second compressing means 66 and 68. However, for optimal control, the braking assembly preferably comprises a housing 82 and pressure plate 84 (FIGS. 7 and 8) for sizing device 86. Housing 82 and especially pressure plate 84 is preferably fabricated from thermoplastic and thermosetting polymers and plastics, including engineering plastics, such as ABS polymers, polycarbonate resins, polyamide resins, and acetal resins like those available under the DuPont trademark Delrin. In addition, the housing and pressure plate assembly may also be fabricated from suitable metals, such as stainless steel and aluminum. Preferably, the interior of housing 82 will seat resilient sizing device 86 without residual slack when in a relaxed state. Pressure plate 84 should slidably fit in the interior of housing rim 88 (FIG. 7) with sufficient space 90 remaining for axial compression of the sizing device 86 before making contact with inner ledge stop 92. Thus, in one embodiment the housing includes threaded bolts 94 at opposing segments of the housing assembly which pass through openings in the pressure plate. That is, pressure plate 84 is affixed to housing 82 with means for holding the two components towards one another, i.e., with threaded bolts 94, washers 96 and threaded hex nuts 98 as shown by FIGS. 7 and 8 for selectively compressing segments of sizing device 86 together with greater force than other adjacent segments of the ring not having such hold-down bolts.

The central opening 100 of the housing and pressure plate assembly is partially filled with inner rim 102 of resilient sizing device 86. Central opening 100 is also of sufficient diameter to receive filling horn 104 loaded with casing 106 having an end-closure cap 108 and a looped string 110 held along the outer side wall of the casing and filling horn.

As threaded hex nuts 98 of the casing brake assembly are tightened against pressure plate 84 resilient sizing device 86 becomes compressed. However, because the segments of the device in the region of the bolts and nuts are under greatest compressive forces only segments of the inner rim 102 are driven inwardly as shown by arrows 112, 114 against the casing and horn. The bore of the resilient sizing device loses its circular configuration and assumes an elliptical-like shape. As a result, a gap 116 remains at the bottom region of the bore between inner rim 102 of the sizing device and filling horn 104 allowing looped string 110 to pass without tearing or rupturing the casing when the meat pump is actuated for filling the casing.

Figure 9:
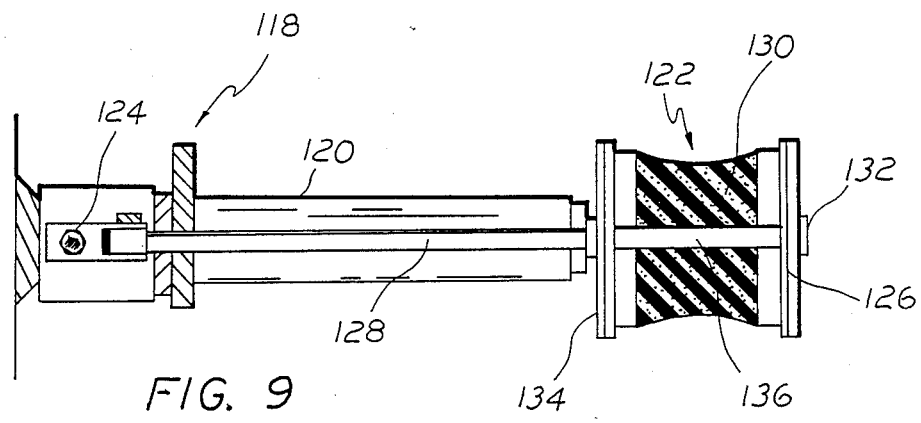
FIGS. 9-11 illustrate a progressive sequence of steps in practicing methods of the present invention.
Figure 10:
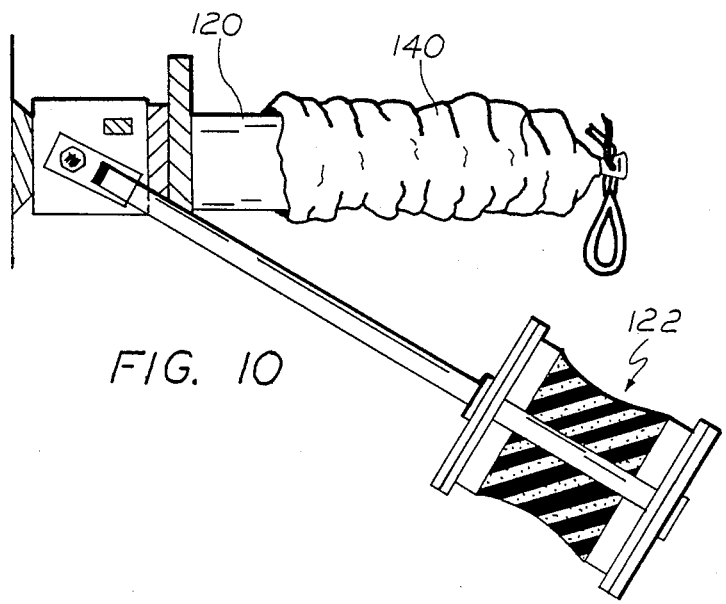
Figure 11:
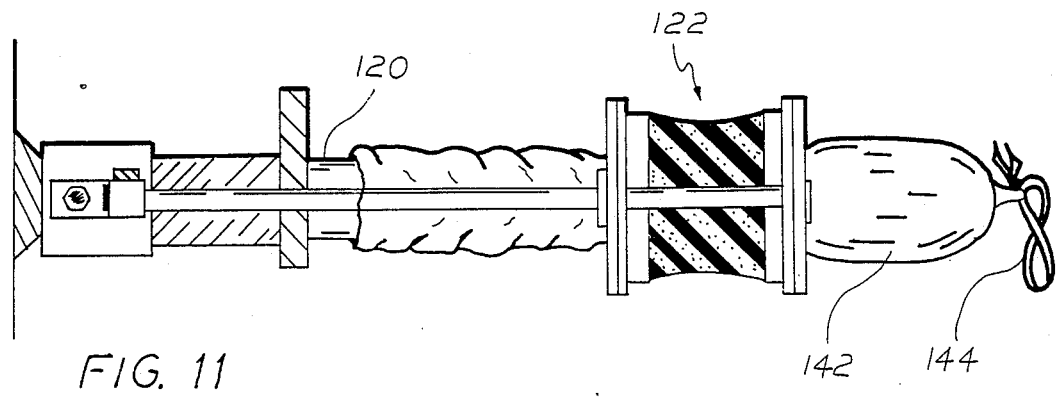

FIGS. 9–11 provide a sequence of steps for practicing methods of the invention. Typically, the food stuffing apparatus employed will have a meat pump of conventional design (not shown), a stuffing horn 120 which may be axially extendible, and the food casing brake assembly 122. Brake assembly 122 includes means 124 for pivoting sizing device 126 downwardly away from the stuffing horn and tie rods 128 for supporting the sizing device. The sizing device 126 includes the hollow sizing ring 130 having a resilient, sheave-like body, a first compression ring 132, a second compression ring 134 and screws 136 on each side of the horn for adjusting the force applied to compression rings 132, 134 to segments of sizing ring 130 lateral to the central axis.

FIG. 10 illustrates downward displacement of food casing braking assembly 122 away from horn 120 for loading with a cut length of string tied casing 140. FIG. 11 shows alignment of brake assembly 122 with horn 120 which is axially advanced into the bore of the sizing ring. String tied loop 144 which is folded against the outer side wall of the casing before filling is initiated is able to pass through ring 130 without rupturing because of the elliptical configuration of the bore, and simultaneously regulate release of unfilled casing from the stuffing horn for outstanding diametrical size control.

Figure 12:
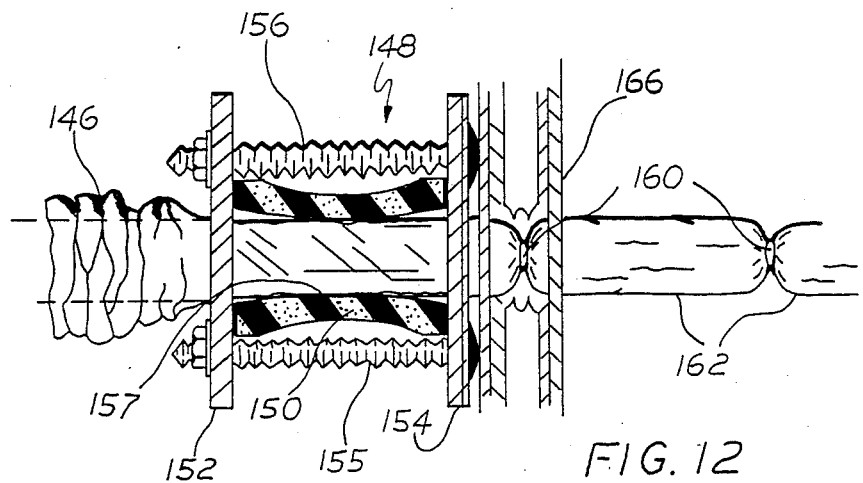
FIG. 12 is a partial side sectional view of the brake system employed in stuffing and clipping shirred casing.

Methods of the present invention have been demonstrated principally in connection with precut lengths of string tied casing. However, the invention also contemplates methods of filling shirred casings, both fibrous and nonfibrous reinforced types, including thermoplastic types without string tied end-closures. This also includes 72 inch long casings—Code 9 (4.65 caliber) for slicing. FIG. 12 demonstrates one application of shirred casing in filling smaller diameter clipped sausages. Resilient sizing ring 150 having a sheave-like body is axially engaged at opposite ends with compression rings 152, 154 affixed with connecting screws 155, 156 for adjusting the force exerted on sizing ring 150. Compression ring 152 may be a rigid metallic member which does not warp or flex when tied down against the sizing ring. The objective of the embodiment of FIG. 12 is to apply uniform axial pressure to sizing ring 150 at all segments of the ring's peripheral edge so that the inner rim 157 of the sizing ring circumferentially engages (360°) the casing on the stuffing horn for preparing straight dimensionally uniform sausages 162. The leading and trailing ends of each sausage may be tied off at clipper 166 with metals clips 160.

Figure 13:
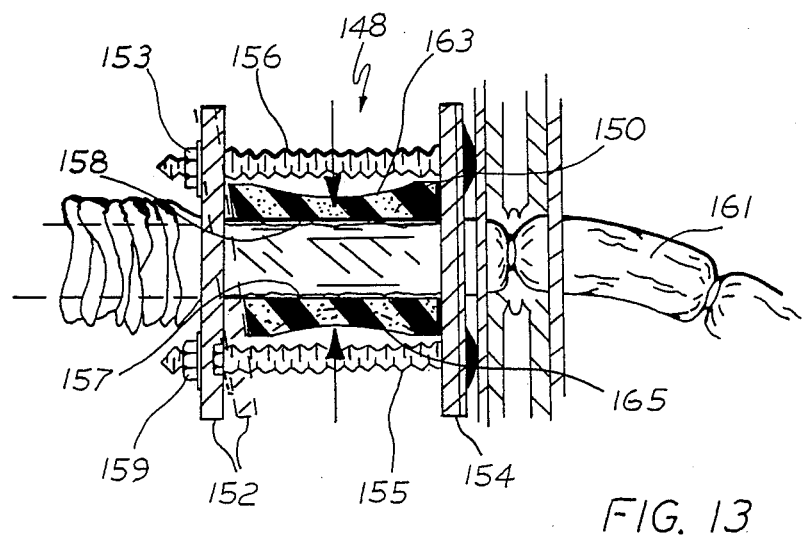
FIGS. 13 and 14 are partial side sectional views of the braking system employed in making curved-type sausage products.

The invention is also adaptable to the preparation of curved "old world" style sausages 161, 164 (FIGS. 13 and 14) by adjusting connecting screws 155, 156. By turning threaded hex nuts 159 a few extra turns more than threaded hex nut 153 compression plate 152 is moved at an angle towards compression plate 154 in the region of connecting screw 155. Because greater pressure is applied to sizing ring 150 in the region of connecting screw 155, the grooved outer rim in region 165 is biased inwardly to a greater extent than the grooved outer rim in region 163. Thus, the inner rim of the sizing ring engages the casing with more frictional pressure in region 157 than in region 158 creating a differential in the rate of release of casing from the stuffing horn so as to produce a curved sausage product 161.

Figure 14:
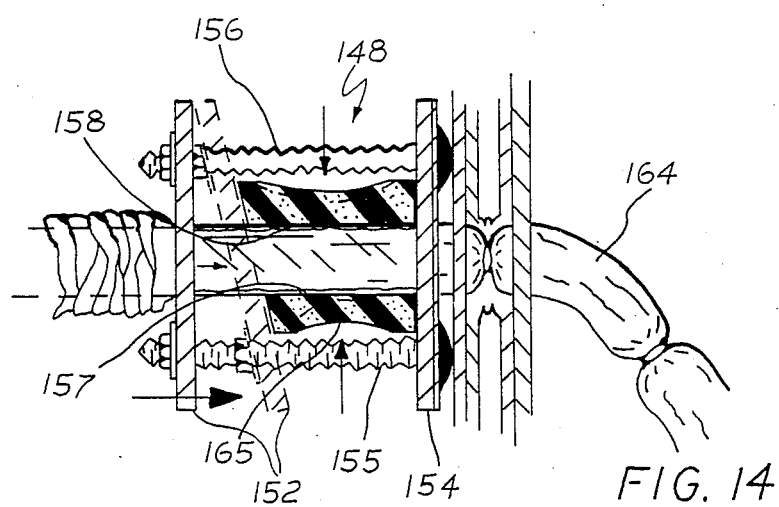

The curvature of the final sausage product can be adjusted as desired. For example, FIG. 14 illustrates that the angle of compression ring 152 may be extended even further than shown by FIG. 13. As illustrated by FIG. 14 this will produce a sausage product 164 having greater curvature than product 161.

Although the invention has been described in considerable detail with respect to the preferred embodiments thereof, it will be apparent that the invention is capable of numerous modifications and variations to those skilled in the art without departing from the spirit and scope of the invention as defined in the appended claims.

What is claimed is:

1. A food casing braking device, which comprises a resilient, generally sheave-like body having a central axis and adapted to receive a filling horn of a stuffing apparatus with a food casing mounted on said filling horn, and further adapted to frictionally engage said casing against said filling horn when axially compressed.

2. The food casing braking device of claim 1 including means for axially compressing the sheave-like body.

3. The food casing braking device of claim 2 in combination with a food stuffing apparatus.

4. A food casing braking device, which comprises a resilient, generally sheave-like sizing ring in combination with means for pressing together said sizing ring, said sizing ring having a grooved outer rim and an inner rim defining an axial bore for receiving a filling horn of a stuffing apparatus, said sizing ring being adapted to compress against the food casing and said filling horn when axially compressed.

5. The food casing braking device of claim 4 wherein the outer rim of the sizing ring comprises a symmetrically shaped groove.

6. The food casing braking device of claim 4 wherein the outer rim of the sizing ring comprises an asymmetrically shaped groove.

7. The food casing braking device of claim 5 wherein the outer rim of the sizing ring comprises a substantially concave-shaped groove.

8. The food casing braking device of claim 5 wherein the outer rim of the sizing ring comprises a substantially V-shaped groove.

9. The food casing braking device of claim 6 wherein the outer rim of the sizing ring comprises an off-center, generally U-shaped groove.

10. The food casing braking device of claim 4 wherein the inner rim of the sizing ring includes groove means running generally with the axial bore.

11. The food casing braking device of claim 4 wherein said sizing ring comprises first and second end plates and said means for pressing together said sizing ring comprises first and second compressing means for engaging opposite sides of said end plates.

12. The food casing braking device of claim 11 wherein the outer rim of said sizing ring comprises a symmetrically-shaped groove.

13. The food casing braking device of claim 11 wherein the outer rim of said sizing ring comprises an asymmetrically-shaped groove.

14. The food casing braking device of claim 11 wherein said first compressing means comprises means for housing said sizing ring and said second compressing means comprises a pressure plate for pressing together said sizing ring in said housing means.

15. The food casing braking device of claim 11 including means for holding the first and second compressing means towards one another for compressing segments of the sizing ring together with greater force than other segments to impart an elliptical configuration to the sizing ring axial bore and for forming at least one gap between said inner rim and filling horn.

16. The food casing braking device of claim 11 including means for holding the first and second compressing means towards one another for expanding the sizing ring inner rim inwardly to engage casing on the filling horn circumferentially.

17. The food casing braking device of claim 11 including means for holding the first and second compressing means toward one another to axially compress first and second segments of each of the sizing ring end plates wherein the first segment is compressed to a greater degree than the second segment forcing the inner rim of the sizing ring to expand inwardly toward the central axis more than the second segment for forming a curved food product.

18. A method for filling a tubular food casing, which comprises the steps of:
(a) loading a precut food casing onto a stuffing horn, said casing having first and second ends, interior and exterior walls, and an end-closure at the first end with means for suspending the casing when filled, affixed to said first end;
(b) applying a casing brake to said casing loaded stuffing horn, said brake comprising a resilient, generally sheave-like sizing ring having a grooved outer rim and an inner rim defining an axial bore, said ring being axially compressed to impart an elliptical configuration to said bore, said ring encircling the exterior wall of the casing while the means for suspending the filled casing lies between the exterior wall of said casing and the inner rim of said sizing ring;
(c) filling the casing with a food stuff while simultaneously controlling the rate of release of casing from the stuffing horn while releasing said means for suspending the filled casing without rupturing the casing at the time of filling, and
(d) closing the second end of the filled casing.

19. A method for filling a tubular food casing which comprises the steps of:
(a) loading a food casing on a stuffing horn at a filling station, said casing having interior and exterior walls;
(b) applying a casing brake to said loaded stuffing horn, said brake comprising a resilient, generally sheave-like sizing ring having a grooved outer rim and an inner rim defining an axial bore for receiving the loaded stuffing horn, said ring being axially compressed to circumferentially expand the inner rim of the sizing ring to engage the exterior wall of said casing, and
(c) filling the food casing while controlling the release of casing from the stuffing horn for dimensional uniformity.

20. The method of claim 19 wherein the casing is a member selected from the group consisting of cellulose, fibrous reinforced cellulose, thermoplastic, and collagen.

21. A method for making a curved sausage product which comprises the steps of:

(a) loading a food casing on a stuffing horn at a filling station, said casing having interior and exterior walls;

(b) applying a casing brake to said loaded stuffing horn, said brake comprising a resilient, generally sheave-like sizing ring having a grooved outer rim, an inner rim defining an axial bore for receiving the loaded stuffing horn and end plates with opposing firs and second segments, and (c) axially compressing the opposing first segments of said sizing ring end plates to a greater extent than the opposing second segments of said sizing ring end plates causing the inner rim of said ring adjacent to said first opposing segments to expand inwardly to frictionally engage the exterior wall of said casing with greater compressive force than the inner rim adjacent to the second opposing segments to provide a curved sausage product.

* * * * *

Disclaimer 4,932,103—*Galen J. Klusmire*, Carmel, Calif. BRAKE-SIZING DEVICES FOR FOOD STUFFING APPARATUS AND METHODS OF USE. Patent dated June 12, 1990. Disclaimer filed Apr. 22, 1991, by the assignee, Teepak, Inc.

Hereby enters this disclaimer to claim 21 of said patent.

[ *Official Gazette July 30, 1991* ]